United States Patent
Pearson et al.

(10) Patent No.: US 10,002,331 B2
(45) Date of Patent: Jun. 19, 2018

(54) ORDER FULFILLMENT SYSTEMS

(75) Inventors: Gregory A. Pearson, Dunedin, FL (US); Ronald Shane Hamilton, St. Petersburg, FL (US); David B. Hall, New Port Richey, FL (US)

(73) Assignee: Gregory A. Pearson, Inc., Dunedin, FL (US)

( * ) Notice: Subject to any disclaimer, the term of this patent is extended or adjusted under 35 U.S.C. 154(b) by 796 days.

(21) Appl. No.: 12/561,771

(22) Filed: Sep. 17, 2009

(65) Prior Publication Data

US 2011/0066527 A1    Mar. 17, 2011

(51) Int. Cl.
| | |
|---|---|
| G06Q 30/00 | (2012.01) |
| G06F 17/30 | (2006.01) |
| G06Q 10/00 | (2012.01) |
| G06Q 10/08 | (2012.01) |
| G06Q 30/06 | (2012.01) |

(52) U.S. Cl.
CPC ......... *G06Q 10/00* (2013.01); *G06Q 10/0875* (2013.01); *G06Q 30/00* (2013.01); *G06Q 30/0635* (2013.01); *G06Q 30/0643* (2013.01)

(58) Field of Classification Search
CPC .......................... G06Q 10/10; G06Q 30/0635
USPC ..................................................... 705/26–27
See application file for complete search history.

(56) References Cited

U.S. PATENT DOCUMENTS

| | | | | |
|---|---|---|---|---|
| 6,321,211 B1 * | 11/2001 | Dodd | | 705/26 |
| 6,370,514 B1 * | 4/2002 | Messner | | 705/14.26 |
| 6,609,106 B1 * | 8/2003 | Robertson | | 705/26 |
| 7,149,710 B1 * | 12/2006 | Edmark | | 705/26 |
| 7,562,036 B2 * | 7/2009 | Smith et al. | | 705/26 |
| 2002/0019776 A1 * | 2/2002 | Simpson | | 705/22 |
| 2002/0032605 A1 * | 3/2002 | Lee | | 705/14 |
| 2004/0099734 A1 * | 5/2004 | Barton et al. | | 235/383 |
| 2006/0122926 A1 * | 6/2006 | Hsu et al. | | 705/35 |
| 2006/0161497 A1 * | 7/2006 | Penney | | 705/37 |
| 2007/0150368 A1 * | 6/2007 | Arora et al. | | 705/26 |
| 2008/0301005 A1 * | 12/2008 | Nieda et al. | | 705/27 |
| 2010/0131392 A1 * | 5/2010 | Archer et al. | | 705/27 |
| 2010/0280913 A1 * | 11/2010 | O'Sullivan et al. | | 705/26 |

OTHER PUBLICATIONS

Grubbs, L. L. (2000). Top 5 auction utilities. PC World.Com, , 1. Retrieved from http://search.proquest.com/docview/200750330?accountid=14753 [recovered from ProQuest on Jul. 17, 2014].*

* cited by examiner

*Primary Examiner* — Kathleen Palavecino
(74) *Attorney, Agent, or Firm* — Troutman Sanders LLP; James E. Schutz; Christopher C. Close, Jr.

(57) ABSTRACT

Order fulfillment systems and methods, which may enable a recipient to retrieve an ordered product from a plurality of providers, and may additionally deliver a virtual representation of the ordered product to the recipient. The order fulfillment method may be a paperless process comprising electronically receiving an order from a customer for a product to be retrieved by the recipient. A virtual representation of the ordered product may then be delivered and displayed to the recipient. A status module may be provided to indicate to providers whether the order has yet been fulfilled. The method may further comprise receiving an update to the status module when the recipient selects a provider and retrieves the ordered product from the selected provider.

12 Claims, 4 Drawing Sheets

ORDER FULFILLMENT SYSTEMS

BACKGROUND

1. Technical Field

Various aspects of the present invention relate to order fulfillment systems and, more particularly, to order fulfillment systems for enabling a recipient to receive an ordered product from one of a plurality of providers and, optionally, delivering a virtual representation of the ordered product to the recipient as well.

2. Description of Related Art

Conventionally, electronic orders can be placed via websites tailored for individual providers. Each of such websites generally offers for sale a set of products to be provided by a predetermined individual provider or family of related providers sponsoring the website.

When placing an order via one of these conventional electronic order systems, a customer can select a delivery method. The customer may be presented with an option to have an ordered product delivered to a specified address, or to pick up the ordered product from a physical store. If store pick-up is selected, the customer must specify a particular store so that the ordered product can be reserved for pick-up in the selected store. Additionally, when picking up the ordered product, the customer must present physical evidence of having electronically purchased the product. Such physical evidence can include an order number, print-out of the order confirmation, the credit card used to make the purchase, or various combinations of these.

Instead of purchasing a product for oneself, the customer may choose to purchase a gift for a recipient party. Examples of such gifts include physical products, virtual flowers, and gift certificates. If the gift is a physical product, options of delivery methods are the same as the delivery options available when the customer purchases the physical product for himself. If the gift is a virtual bouquet of flowers, an image of flowers may be mailed to the recipient's email address.

Alternatively, if the gift is a gift certificate, an electronic confirmation may be sent to the customer, the recipient, or both. The electronic confirmation may arrive via email, and may include an image representing the gift certificate. To redeem the gift certificate via an electronic order system, the recipient enters unique identification data associated with the gift certificate when placing an order. Such unique identification data evidences the recipient's possession of the gift certificate. Alternatively, the gift certificate may be redeemable at a physical location of the provider by displaying some form of the gift certificate, such as a print-out or a physical gift card. If evidence of the gift certificate is lost, the recipient generally has no way to redeem the gift certificate.

Conventional electronic order fulfillment systems have at least a few drawbacks. First, they are tailored to a predetermined sponsoring provider, and only offer products that can be provided by the sponsoring provider. Second, customers must specify an exact location for picking up an ordered product. Third, recipients of gift certificates are burdened by having to retain and present evidence of their gift certificates upon making a purchase.

Therefore, there is a need for an order fulfillment system enabling a customer to place an order for a product for himself or another recipient without limitation to a single provider or family of providers. In an exemplary embodiment, such an order fulfillment system may electronically notify the recipient of the order, and the electronic notification may, in some instances, comprise delivery of a virtual representation of the ordered product or service. There is a further need for an order fulfillment system allowing the recipient to pick up the ordered product or service from a provider selected by the recipient, and at a physical location selected by the recipient. Additionally, it is desirable that neither the customer nor the recipient be required to pre-specify a provider or physical pick-up location. It is further desirable that the order fulfillment system need not require the recipient to present an order confirmation upon redemption of the order. It is to such an order fulfillment system that some embodiments of the present invention are directed.

SUMMARY

Exemplary embodiments of the present invention may include electronic order fulfillment systems enabling physical pick-ups and, optionally, virtual deliveries of an ordered product, such that the physical pick-ups may occur at physical locations of various independent providers.

Through an exemplary embodiment of an order fulfillment system, a customer, or sender, may select a product and purchase that product for himself or for a recipient. The product may be, for example, a gift for the recipient. The order fulfillment system may receive the order and, in response, may notify the recipient that the ordered product was ordered for the recipient. Such notification may occur by delivering and displaying a virtual representation of the ordered product to the recipient. The virtual representation may arrive via email or may be displayed to the recipient unprompted via a web client or other delivery mechanism. The virtual representation may comprise, for example, an image or animation representing the ordered product.

The recipient may pick up the ordered product at any of a plurality of physical locations associated with a plurality of providers. Providers of the order fulfillment system may include merchants, service providers, manufacturers, producers, distributors, wholesalers, and various other providers of goods, services, or both. Further, in an exemplary embodiment of the order fulfillment system, the plurality of providers may comprise some providers that are not directly related to one another. In other words, various groups of two or more of the participating providers may be owned or operated independently from each other.

The recipient may select a provider and pick-up location of his or her choosing. The order fulfillment system may provide a list or directory of participating providers to assist the recipient in his or her selection. In an exemplary embodiment of the order fulfillment system, the recipient need not specify a provider pick-up location before appearing to pick up the ordered product.

The order fulfillment system may further provide a status module for receiving and retaining a status of an order. The status module retains a record of the order and may receive and retain status updates from providers. When the recipient selects a pick-up location of a particular provider and requests the ordered product and the location, the provider may utilize the status module of the order fulfillment system to confirm the order and to determine whether the ordered product has been picked up yet. After giving the ordered product to the recipient, the provider may update the status module to indicate that the ordered product was delivered to the recipient. Additionally, the status module may notify the customer that the ordered product has been picked up.

The order fulfillment system may be implemented on computer hardware, computer software, or both. Accordingly, all or part of the order fulfillment system may be embodied in computer-readable media and may be executable by one or more computer processing units.

These and other objects, features, and advantages of the electronic order fulfillment system will become more apparent upon reading the following specification in conjunction with the accompanying drawing figures.

DETAILED DESCRIPTION

Figure 1:
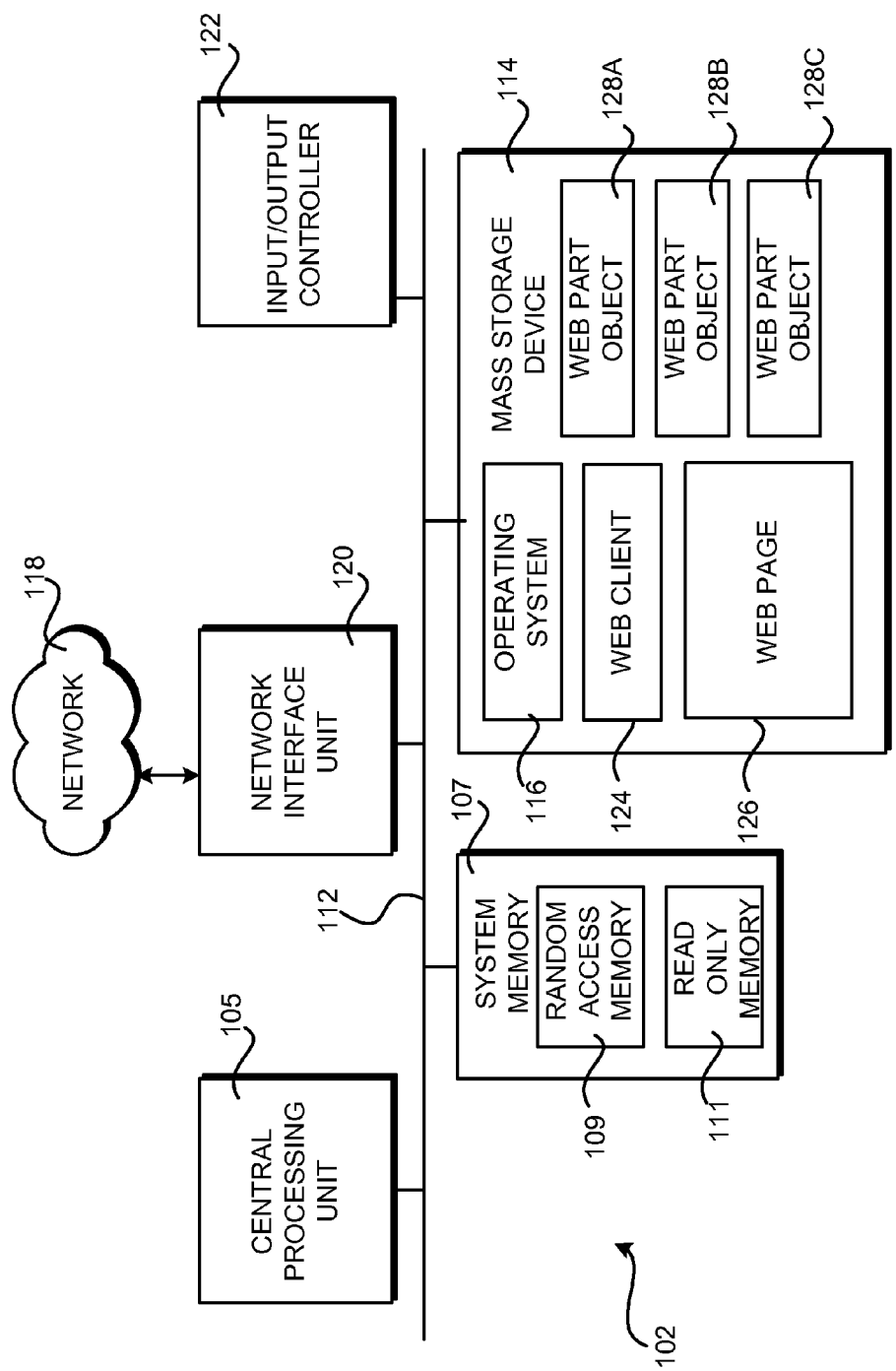
FIG. 1 illustrates an architecture of a client computer utilizing an order fulfillment system, in accordance with an exemplary embodiment of the present invention.

To facilitate an understanding of the principles and features of the present invention, various illustrative embodiments are explained below. Exemplary embodiments of the invention comprise electronic order fulfillment systems enabling pick-up from various providers and, optionally, initiating virtual delivery of an ordered product. In particular, embodiments of the order fulfillment system are described in the context of a virtual bar for purchasing drinks for recipients to pick up at various physical bars. Embodiments of the invention, however, are not limited to virtual bars. Rather, embodiments of the invention may be various virtual stores or virtual combinations of stores selling goods, services, or both.

The components described hereinafter as making up various elements of the invention are intended to be illustrative and not restrictive. Many suitable components that would perform the same or similar functions as components described herein are intended to be embraced within the scope of the order fulfillment system. Such other components not described herein may include, but are not limited to, for example, components developed after development of the invention.

Referring now to the figures, wherein like reference numerals represent like parts throughout the views, various embodiments of the order fulfillment system and method will be described in detail.

Figure 3:
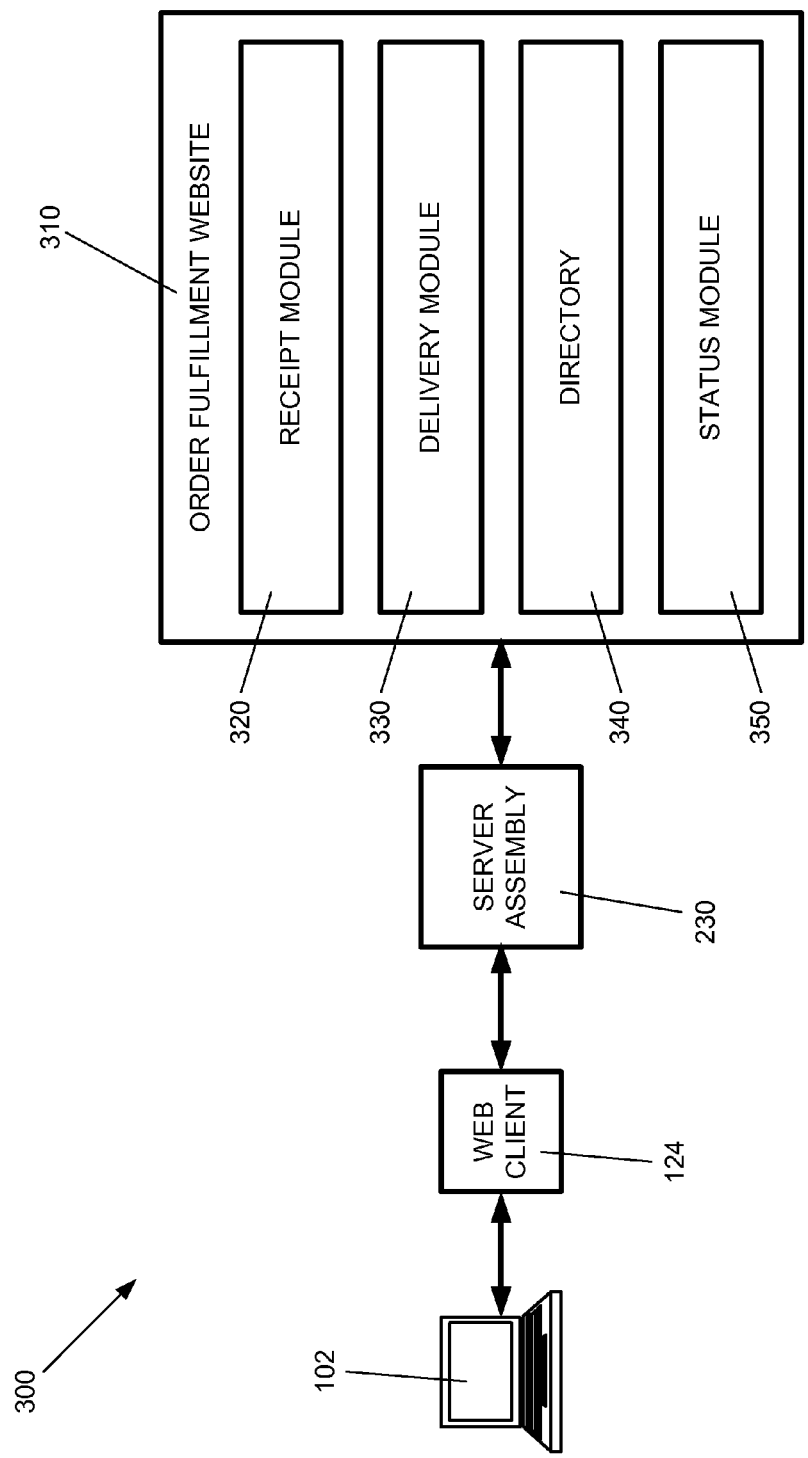
FIG. 3 illustrates a block diagram of the order fulfillment system, according to an exemplary embodiment of the present invention.

FIG. 1 illustrates a computer architecture for a client computer 102, in accordance with an exemplary embodiment of the present invention. The client computer 102 may be used to access a website, such as an order fulfillment website 310 for the order fulfillment system 300 (FIG. 3). Those skilled in the art will recognize that the general architecture described in reference to FIG. 1 is for example only, and may be modified to accommodate various embodiments of the order fulfillment system 300 (FIG. 3) and particular operational environments. As shown in FIG. 1, the client computer 102 may comprise a central processing unit 105 ("CPU") and one or more system memories 107, such as a random access memory 109 ("RAM") and a non-volatile memory, such as a read-only memory ("ROM") 111. The client computer 102 may further comprise a system bus 112 coupling together the memory 107, the CPU 105, and various other components. A basic input/output system containing routines to assist in transferring information between components of the client computer 102 may be stored in the ROM 111.

Figure 2:
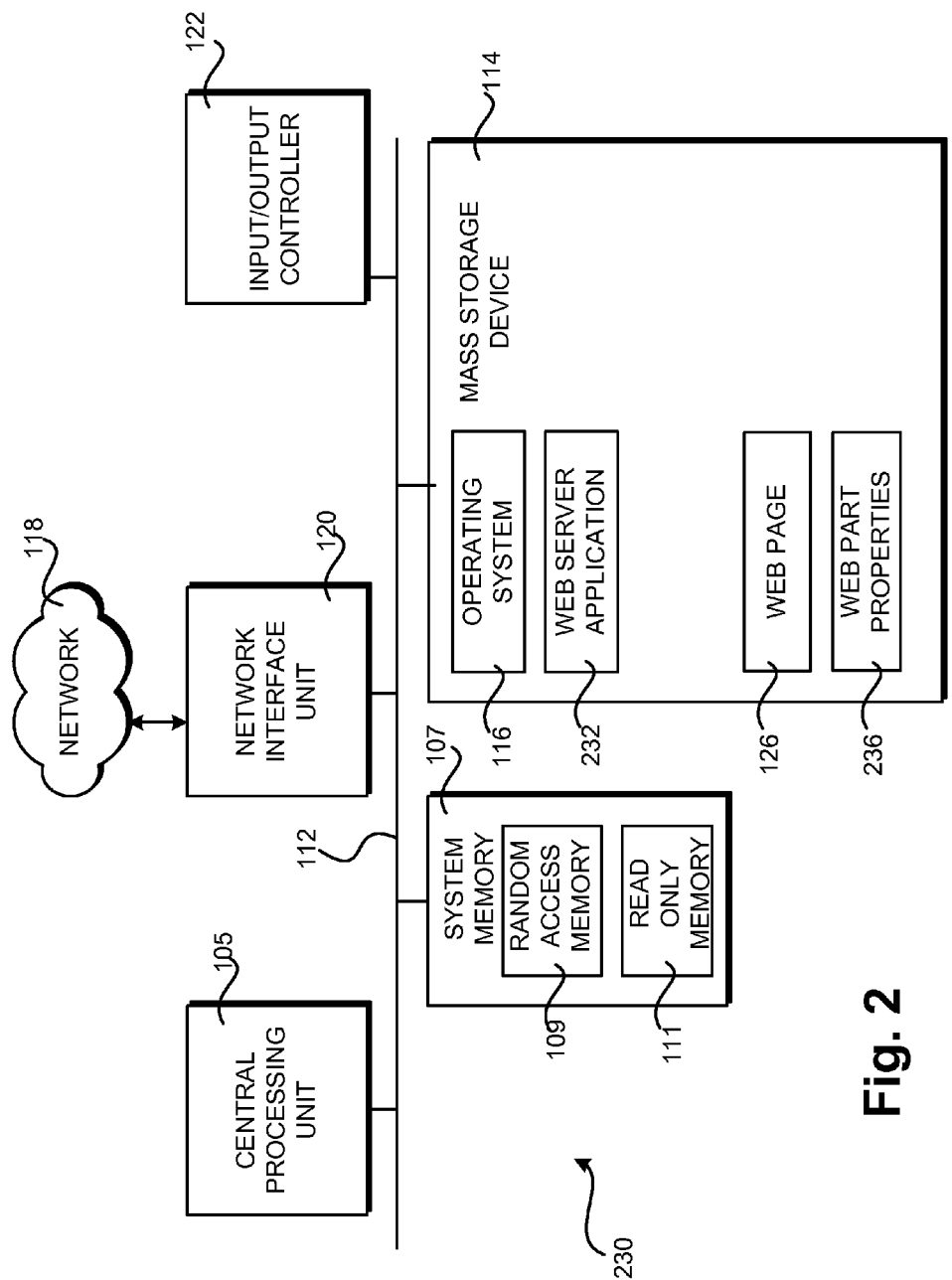
FIG. 2 illustrates an architecture of a server assembly of the order fulfillment system, according to an exemplary embodiment of the present invention.

The client computer 102 may comprise, or may be associated with, various forms of computer-readable media. One such form of computer-readable media may be embodied in a mass storage device 114. Although the description of computer-readable media contained herein generally refers to a mass storage device 114, such as a hard disk or CD-ROM drive, it will be appreciated by those skilled in the art that computer-readable media may include many available media accessible by the client computer 102 or a server assembly 230 (FIG. 2). The mass storage device 114 may store an operating system 116, application programs, and other program modules. The mass storage device 114 may be connected to the CPU 105 through a mass storage controller (not shown) connected to the bus 112. The mass storage device 114 may provide non-volatile storage for the client computer 102.

Computer-readable media may include computer storage media, such as volatile and non-volatile, removable and non-removable media implemented in many methods or technologies for storage of information, such as computer-readable instructions, data structures, program modules, or other data. Computer storage media may include, but is not limited to, RAM, ROM, EPROM, EEPROM, flash memory, other solid state memory technology, CD-ROM, digital versatile disks ("DVD"), other optical storage, magnetic cassettes, magnetic tape, magnetic disk storage, other magnetic storage devices, or many other media that may be used to store the desired data and may be accessible by the client computer 102 or the server assembly 230. Computer-readable instructions on the storage media of the client computer 102 may include, for example, instructions for implementing processes, preferably client-side processes, of the order fulfillment system 300.

According to various embodiments, the client computer 102 may operate in a networked environment using logical connections to remote computers, such as the server assembly 230, through a network 118, such as the Internet. The client computer 102 may connect to the network 118 through a network interface unit 120 connected to the bus 112. It will be appreciated that the network interface unit 120 may also be utilized to connect to other types of networks and remote computer systems.

The client computer 102 may also include an input/output controller 122 for receiving and processing input from a number of other devices, including a keyboard, mouse, or electronic stylus. The input/output controller 122 may provide output to a display screen, a printer, or other type of output device.

A number of program modules and data files may be stored in the mass storage device 114 and RAM 109 of the client computer 102. Such program modules and data files may also include an operating system 116 suitable for controlling operations of a networked personal computer. A web browser application program, or web client 124, may also be stored on the mass storage device 114 and the RAM 109. The web client 124 may comprise an application program for requesting and rendering web pages 126 created in Hypertext Markup Language ("HTML") or other types of markup languages. The web client 124 may also be capable of executing scripts through the use of a scripting host. The scripting host executes program code expressed as scripts within the browser environment.

The web client 124 may be operative to execute one or more client side objects. Client side objects are executable objects that may be identified in a web page 126 and executed in conjunction with the rendering of the web page 126. For instance, JAVA® applets or ACTIVEX® controls may be identified on a web page 126 and rendered by the web client 124 to generate a portion of the display of the web page 126.

According to an exemplary embodiment of the invention, the web client 124 may be further operative to utilize client side objects called web part objects 128A-128C, or web parts. Web part objects 128A-128C are reusable client side objects that stand and contain web-based content such as Extensible Markup Language ("XML"), HTML, and scripts. Web parts 128A-128C have a set of standard properties that control how they are rendered. These properties enable web parts to be storage-neutral and reusable. Because web parts 128A-128C adhere to a common standard, they may be stored in libraries, which may be utilized to create a variety of web pages 126. Web pages 126 that include web part objects 128A-128C may be referred to herein as web part pages.

Referring now to FIG. 2, a server assembly 230 utilized in various exemplary embodiments of the order fulfillment system 300 is illustrated. The server assembly 230 may service the website 310 by receiving and responding to requests from web clients 124. The server assembly 230 may comprise various combinations of hardware and software for supporting the website 310. The server assembly 230 described in FIG. 2 is an exemplary server configuration and may be modified to accommodate various embodiments of the order fulfillment system 300. As shown in FIG. 2, the server assembly 230 may include many of the conventional computing components included in the client computer 102 and described above with respect to FIG. 1. In particular, the server assembly 230 may include a CPU 105, a network interface unit 120 connected to a network 118, such as the Internet, a system memory 107, and a mass storage device 114.

The mass storage device 114 utilized by the server assembly 230 may typically be operative to store an operating system 116 suitable for servicing the website 310 and controlling operations of a server computer. The mass storage device 114 and its associated computer-readable storage media provide non-volatile storage for the server assembly 230. Computer storage media may include volatile and non-volatile, removable and non-removable media implemented in many methods or technologies for storage of information, such as computer-readable instructions, data structures, program modules, or other data. Computer-readable instructions on the computer-readable media of the server assembly 230 may include, for example, instructions for implementing processes, preferably server-side processes, of the order fulfillment system 300.

The server assembly 230 may utilize a web server application 232. The web server application 232 may receive and respond to requests from web clients 124 at remote computers, such as the client computer 102, for web pages 126 located at or accessible to the server assembly 230. It will be appreciated that web pages 126, as described herein, include both those pages stored statically and utilizing only HTML, as well as pages generated dynamically through use of server-side scripting technologies.

According to various embodiments of the order fulfillment system 300, the web server application 232 may receive requests for web pages 126 that include one or more web parts 128A-128C. As discussed above, web parts 128A-128C may comprise client-side objects that may be used by the web client 124 when displaying a web page 126.

FIG. 3 illustrates a block diagram of the order fulfillment system 300, according to an exemplary embodiment of the present invention. As illustrated in FIG. 3, the order fulfillment system 300 may comprise various combinations of a receipt module 320, a delivery module 330, a directory 340, and a status module 350, all of which may be in communication with one another. These components of the order fulfillment system 300 may, but need not, be integrated into an order fulfillment website 310, as shown. When the order fulfillment system 300 is implemented through a website 310, a user of the order fulfillment system 300 may access components of the order fulfillment system 300 via a web client 124 at a client computer 102. Through the web client 124, the client computer 102 and, accordingly, the user can be in communication with a server assembly 230 supporting the website 310.

Receipt Module

The receipt module 320 of the order fulfillment system 300 may receive and accept orders placed by customers. The receipt module 320 may comprise a virtual store offering a plurality of products to users, who act as customers of the store. The offered products need not be provided by a single provider and, further, need not comprise products traditionally offered for sale via websites. For example, and not limitation, the virtual store may offer alcoholic beverages, flowers, gifts, spa services, or many combinations of these and other products. Additionally, such products need not be associated with a particular provider in the virtual store.

The website 310 may implement an accounting mechanism for retaining a status of credits useable for purchases through the virtual store. Accordingly, a customer may have a credit account associated with a user account on the website 310. The credit account may be used to purchase products from the virtual store. Depending on implementation of the order fulfillment system 300, the credit account may correspond to actual or virtual currency.

Via the receipt module 320, the customer may place an order for one or more products, which may be goods, services, or both. While placing the order, the customer may make a payment using traditional currency or the customer's credit account. During or after placing the order, the customer may specify an intended recipient of the ordered product. The recipient may be the customer himself or may be a separate individual or entity. The customer may also, but need not, specify one or more requirements for delivery of the ordered product to the recipient. For example, the customer may select a set of one or more providers from which the recipient may elect to pick up the ordered product. If no providers are selected, preferably, the recipient may select a provider herself, as described in further detail below. For further example, the customer may specify an expiration time or date for picking up the ordered product, or a timeframe during which the ordered product may be picked up.

In an exemplary embodiment of the order fulfillment system 300, the customer may customize an ordered product. For example, if the customer orders a beer, the customer may specify a particular beer brand. If the customer orders a mixed drink, the customer may specify the name of the drink or the drink ingredients. If the customer orders a bouquet of flowers, the customer may specify individual flowers to be included in the bouquet. The virtual store may additionally offer predetermined packages for products, such as a package of a dozen red roses with baby's breath, for the customer's selection without further customization.

The receipt module 320 may accept the customer's order and transfer data relating to the order to the delivery module 330, the status module 350, or both.

Delivery Module

In response to receipt of the order by the order fulfillment system 300, the delivery module 330 of the order fulfillment system 300 may deliver notification of the order to the recipient. Such notification may include various data, including, without limitation, a name or alias of the customer, identification of the specific ordered product, a quantity of the ordered product, a virtual representation of the ordered product, specific providers and/or provider locations for delivery of the ordered product, or a combination thereof.

If a virtual representation of the ordered product is delivered to the recipient, such virtual representation may comprise various non-physical representations of the ordered product. For example, and not limitation, the virtual representation may comprise an image or animation of the order product or of a product related to the ordered product. The delivery module 330 may deliver the virtual representation to the recipient by various means, such as, for example, via an email or other digital communication containing the virtual representation, via an email or other digital communication directing the recipient to the website 310 to view the virtual representation, or via a prompted or unprompted web-based media object.

When the recipient is subscribed to the website 310 or has a user account with the web site 310, the delivery module 330 may deliver the virtual representation in the form of a web-based media object. The web-based media object may be delivered to the recipient, prompted or unprompted, when the recipient logs into the website 310 or otherwise indicates a willingness to interact with the order fulfillment system 300.

The web-based media object may comprise an image, animation, or other audio or visual representation of the ordered product. For example, and not limitation, the media object may comprise an animation in conjunction with an illustration package capable of superimposing a user's existing display objects. The animation in the media object may be implemented in various formats, such as Flash™, Microsoft Silverlight™, or the like. When displayed, the media object may have a transparent background. In other words, media objects of the order fulfillment system 300 may appear to float in front of other objects displayed on a client computer 102 of the recipient.

Media objects may be dynamic and customizable to personalize interactions between the customer and the recipient. For example, if the customer selects ingredients for a purchased mixed drink, the media object may include an animation of a drink being prepared from the selected ingredients.

Additionally, a gift note or other supplementary object may accompany the virtual representation of the ordered product. For example, and not limitation, the media object may comprise, in addition to a virtual representation of the ordered product, a personalized note to the recipient. The receipt module 320 may prompt the customer to enter custom text to be displayed in the note. When the recipient receives the note, an animation may play in a web client 124 of the recipient. The animation may display a customized or standard representation of the ordered product and, for example, a pen writing a gift note having the custom text entered by the customer.

When a product is ordered, thereby prompting a media object to be sent to the recipient, the media object and any customer customizations may be stored and queued on the server assembly 230. To efficiently utilize space on the server assembly 230, if a media object includes an animation, the media object may preferably comprise no more than approximately 30 seconds of animation at 30 frames per second. Additionally, the file size of a media object is preferably no more than approximately 150 kilobytes. Those of skill in the art will recognize that these exemplary animation characteristics and file size are not restrictive but are provided as sample characteristics for use in an exemplary computer system.

Before its delivery, the media object may be stored in a queue of the server assembly 230. In an exemplary embodiment, display of the media object on the recipient's client computer 102 may be purposely delayed until a predetermined event occurs. For example, such display may be delayed until the recipient focuses his or her activity on a window displaying the website 310 or otherwise indicates a willingness to interact with the order fulfillment system 300.

In an exemplary embodiment of the deliver system 330, the media object may be delivered to the recipient's client computer 102 through a pull method. The pull method may be implemented by creating a pulse, or heartbeat, that is repetitively fired by the recipient's web client 124, and may be received by the server assembly 230. The request may inform the server assembly 230 of a current state of the web client 124 and any events that should be handled. In return for each pulse sent by the web client 124, data is delivered to the web client 124 regarding how to handle such events.

The customer's order may create an event and related metadata on the server assembly 230. The server assembly 230 may read the metadata to determine how to handle the event, and may determine that, based on the order data, a media object should be transmitted to the recipient's computer 102. The server assembly 230 may then create an event and metadata for the recipient's web client 124, and may retain that event and metadata in a queue until the server assembly 230 receives a communication from the recipient's web client 124. When the recipient's web client 124 fires a pulse, the server assembly 230 may respond by transmitting the data in its queue, such as the event related to the media object, to the web client 124. The web client 124 may then receive the data in the queue, including the media object event. After the event is received, the recipient's web client 124 may display the media object selected by the customer.

In an alternative exemplary embodiment, in which a communications channel is enabled between the recipient's web client 124 and the server assembly 230, the media object may be delivered to the recipient's client computer 102 via a push method. In that case, the server assembly 230 may remain aware of the web client 124 because of the open channel and, therefore, the web client 124 may remain available to respond to requests sent by the server assembly 230. The server assembly 230 may send the event and associated metadata directly to the recipient's web client 124 without the web client 124 firing a pulse to determine whether it should receive the media object.

Those of skill in the art will recognize that, the above-described methods for delivering a web-based media object or other virtual representation of the ordered product are merely exemplary. Various methods for delivering a virtual representation of the ordered product may be implemented in the order fulfillment system 300.

Providers and the Provider Directory

As mentioned above, the order fulfillment system 300 need not be tailored to a particular provider or family of providers. The order fulfillment system 300 may offer for sale products related to various specified or unspecified providers. Providers of the order fulfillment system may include combinations of merchants, service providers, manufacturers, producers, distributors, wholesalers, and various other providers of goods, services, or both.

In an exemplary embodiment, providers participating in the order fulfillment system 300 may comprise related and unrelated providers. For example, two or more of the providers may be affiliated with each other, such as by being branches or sites of a single company, or being jointly owned or operated. Additionally, two or more of the providers may be unaffiliated with each other and, for example, may be separately owned, operated, or both. Indeed, providers may be direct or indirect competitors in a market. In an alternate exemplary embodiment, all of the providers may be affiliated with one another, or all of the providers may be unaffiliated with one another.

A provider may directly or indirectly provide products offered through the order fulfillment system 300. Providers at different distribution levels, such as a producer and a merchant or service provider, may have different features related to their accounts on the order fulfillment system 300. For example, and not limitation, a producer that is not also a direct provider, such as a merchant or service provider, need not provide a pick-up location for products ordered on the system. In that case, the producer's account may be used to track orders and deliveries of products produced by the producer. In contrast, a direct provider's account may be used to check the status of orders when recipients show up and request order fulfillment by the direct provider. A provider that acts as both producer and direct provider may have an account that includes features of both producer and direct provider accounts.

Additionally, accounts of providers at different distribution levels of the same products may be linked together. For example, bars may have accounts linked to alcohol producer accounts, such that bars have access to some information available through the alcohol producer accounts. When a customer orders an alcoholic product produced by a particular alcohol producer, the associated order may be accessible through the alcohol producer's account. Because of the link between the alcohol producer and a local bar, when the recipient of the ordered alcoholic product attempts to redeem the order at the local bar, the local bar may access the order through its link to the alcohol producer's account.

Implementation of account linking may take various forms depending on, for example, implementation of data storage related to accounts, system management preferences, or developer preferences. For example, and not limitation, stored data associated with a producer account may reference direct providers of the producer's products. Alternatively, such stored data may reference categories of direct providers that tend to provide the producer's products. Direct providers referenced directly or by category may, through their own accounts, access orders related to the producer's products. Further alternatively, a producer may affirmatively select and deselect providers who may access orders related to the producer's products. Direct providers may be linked to an entire producer account, including all products of the producer, or, alternatively, to only select products of the producer.

In some exemplary embodiments, direct providers may have total access to a linked producer's account. In some other exemplary embodiments, however, orders relating to a linked producer's products may be viewable directly through a direct provider's account, so as to keep the linked producer and direct provider accounts separate. Various combinations of the above, and other, implementations may be used to link provider accounts in the order fulfillment system 300.

Although account linkage may be used to enable direct providers to access order information, other methods of providing access to order information may be utilized as well, or alternatively. For example, in an exemplary embodiment, the order fulfillment system 300 may maintain a database associating products offered through the order fulfillment system 300 with providers, including direct providers, producers, or both. Accordingly, when an order is placed for a specific product, providers associated with the specific product may access information relating to the order upon request.

For the reference of system users, the order fulfillment system 300 may include a directory 340 of participating providers. A user, such as a recipient of an ordered product, of the order fulfillment system 300 may access the directory 340 to identify a physical location for retrieving the ordered product. The directory 340 may comprise a list of providers, their physical locations, and, optionally, their phone numbers or other identifying information. Preferably, the list of providers may be organized and sorted in a predetermined manner or based on user preference, and further preferably, the recipient may sort and search provider entries in the directory 340 to assist in selecting a provider. For example, based on the particular product ordered, the recipient may be presented with a list of providers who carry the product. For another example, if the ordering customer specified a subset of providers from which the recipient could pick-up the product, the recipient may be presented with the providers in the subset.

Through the various participating providers, embodiments of the order fulfillment system 300 may enable convenient delivery to a recipient of an ordered product. The recipient may select a participating provider to deliver the ordered product, such as by choosing a provider from the provider directory 340. For purposes of some embodiments of the order fulfillment system 300, a delivery of the product may comprise local or remote delivery. For example, an ordered product may be delivered locally at a provider's physical location when picked up by the recipient at the provider's location. Alternatively, delivery may occur when a provider sends the ordered product to the recipient.

In an exemplary embodiment, when local pick-up is used, neither the customer nor the recipient may need to indicate a pick-up location or a particular provider from which the ordered product will be retrieved. The particular provider need not receive notice of the order until the recipient shows up at the provider's location to retrieve the ordered product from the provider. An alternative exemplary embodiment, however, may require the recipient to indicate the selected provider to the order fulfillment system 300, and may then require the recipient to pick up the ordered product from the indicated provider.

After making a selection and, only if required, indicating the selected provider to the order fulfillment system 300, the recipient may proceed to a physical location of the selected provider to retrieve the ordered product. To pick up the ordered product, the recipient may need only to identify him or herself, which may entail presenting a form of identification. After confirming the order via the status module 350, the selected provider may surrender a physical representation of the ordered item, such as the ordered item itself, to the recipient.

A participating provider may benefit from participation in the order fulfillment system 300 in various manners, and the benefit need not be direct monetary compensation. In one exemplary embodiment, an operator of the order fulfillment system 300 may share revenues received from a purchase with the provider selected by the recipient. Alternatively, the provider may not receive monetary compensation, or may receive only nominal monetary compensation, from the order. In that case, the provider may still benefit from its participation by being included in the directory 340, which may be accessible to users of the order fulfillment system 300. Additionally, the website 310 may include advertisements for the provider to potentially increase the provider's customer base.

In an exemplary embodiment of the order fulfillment system 300, provider compensation may vary based on the product ordered. For example, if the ordered product is a beer or other relatively inexpensive and easily procurable item, the provider may not receive direct monetary compensation. In contrast, more valuable products or products that are more difficult to procure may result in direct monetary compensation for the provider.

Status Module

The status module 350 may retain records of statuses of orders placed through the order fulfillment system 300. To retain such records, the status module 350 may be in communication with one or more databases on, or accessible to, the server assembly 230. After an order is initially placed, the status module 350 may retain a status of the order. The status of the order may comprise a record of data associated with the order, which data may include at least whether the ordered product has been delivered to the recipient, and may also include the recipient's name, the customer's name, an identification of the ordered product, or a combination thereof.

Providers may subscribe to the order fulfillment system 300 and, through a provider account, a provider may access the status module 350 to view the status of one or more orders. In an exemplary embodiment of the order fulfillment system 300, the provider may have access to only a predetermined set of orders placed through the order fulfillment system 300. For example, and not limitation, the provider may access orders relating to products carried by the provider, orders for which the ordered product has not yet been picked up, or orders for which the customers selected the provider as an optional pick-up location. Alternatively, the provider may have access to all orders, or all orders within a predetermined time period.

When a recipient appears at a provider location to pick up the ordered product, the selected provider may determine a status of the order by looking up the order through the status module 350. The order status may be retrieved via the status module 350 based on data presented by the recipient, such as the recipient's name. The provider may access the status module 350 to request the status of the order. The status module 350 may identify the ordered product, and may indicate whether the ordered product has been picked up at the provider's location or at another provider's location. If multiple quantities of the ordered product were ordered by the customer, the status module 350 may indicate whether any quantity of the ordered product remain to be retrieved. In an exemplary embodiment of the order fulfillment system 300, the status module 350 may indicate either or both of: (a) whether a quantity of the ordered product remains to be retrieved, or more specifically, (b) a specific quantity of the ordered product remaining to be retrieved. If a quantity of the ordered product has not yet been retrieved, as indicated by the status module 350, the provider may surrender the ordered product to the recipient after verification of the recipient's identity.

Identity verification may be conducted manually, through the order fulfillment system 300, or both. For example, if only manual identification of the recipient is required, the recipient may simply present a photo identification to the provider. Alternatively, the order fulfillment system 300 may require identification to be performed through the order fulfillment system 300. For example, and not limitation, the provider may log into its provider account, and through that account, may conduct a search to determine whether the recipient is associated with an unfulfilled order accessible by the provider. If such an order is located, the recipient may be required to enter a password, such as a personal identification number. If the order fulfillment system 300 verifies the password as belonging to the recipient, the order fulfillment system 300 may approve redemption of the order. Additionally, for additional security during the identification process, the provider may be asked to enter a password before or after the recipient enters a password. Redemption approval may depend on verification of passwords associated with both the provider and the recipient.

If the provider has a digital capture device, such as a webcam, a photograph of the recipient may be taken upon redemption approval. If necessary, the photograph may later be used to prove, or disprove, that the recipient, as opposed to a person masquerading as the recipient, redeemed the order.

If system identification of the recipient is required, then failure of the provider to require the recipient to take the proper steps to identify him or herself to the order fulfillment system 300 may result in the provider's not receiving agreed-upon compensation from the operator of the order fulfillment system 300. Accordingly, the order fulfillment system 300 may act as a virtual escrow account, requiring verification from both the recipient and the provider before approving release of the ordered product.

After providing the recipient with the ordered product, the provider may update the status module 350 by indicating to the status module 350 that the ordered product was picked up and, if applicable, what quantity of the ordered product was picked up. Accordingly, through the status module 350, the provider may indicate to the order fulfillment system 300 that the recipient has selected a provider and that one or more quantities of the ordered product were delivered to the recipient. In an exemplary embodiment of the order fulfillment system 300, the selected provider may also indicate via the status module 350 that the specific selected provider delivered the ordered product to the recipient. Such indication may occur automatically based on the provider's account with the order fulfillment system 300. For example, the order fulfillment system 300 may recognize and automatically register that a particular provider delivered the ordered product based on the fact that the particular provider's provider account was used to indicate product retrieval to the status module 350.

Upon receiving data from the provider regarding order retrieval, the order fulfillment system 300 may update the status module to reflect that the ordered product, or a specific quantity of the ordered product, was retrieved. Accordingly, if a second provider accesses the status module 350 to determine whether to deliver the ordered product to the recipient, the status module 350 may indicate to the second provider an updated status of the order, based on a quantity of the ordered product remaining to be delivered to the recipient. As a result, each ordered product may be retrieved only a limited number of times. For example, if a single quantity of a product is ordered, only a single quantity may be retrieved by the recipient. Analogously, if multiple quantities of a product are ordered, then no more than the quantity ordered may be retrieved from one or more providers.

After receiving an indication that the ordered product was picked up, the status module 350 may alert the customer that the product has been delivered. The alert can occur in various manners. For example, and not limitation, the order fulfillment system 300 may send the customer an email or an automated telephone call. In some embodiments, a notification can be placed on the customer's account, such that when the customer logs into his or her account, the customer can view the notification of the delivery. Through similar means used to alert the customer, the status module 350 may also alert a producer of the ordered product that the product was delivered.

Exemplary Order Handling

Figure 4:
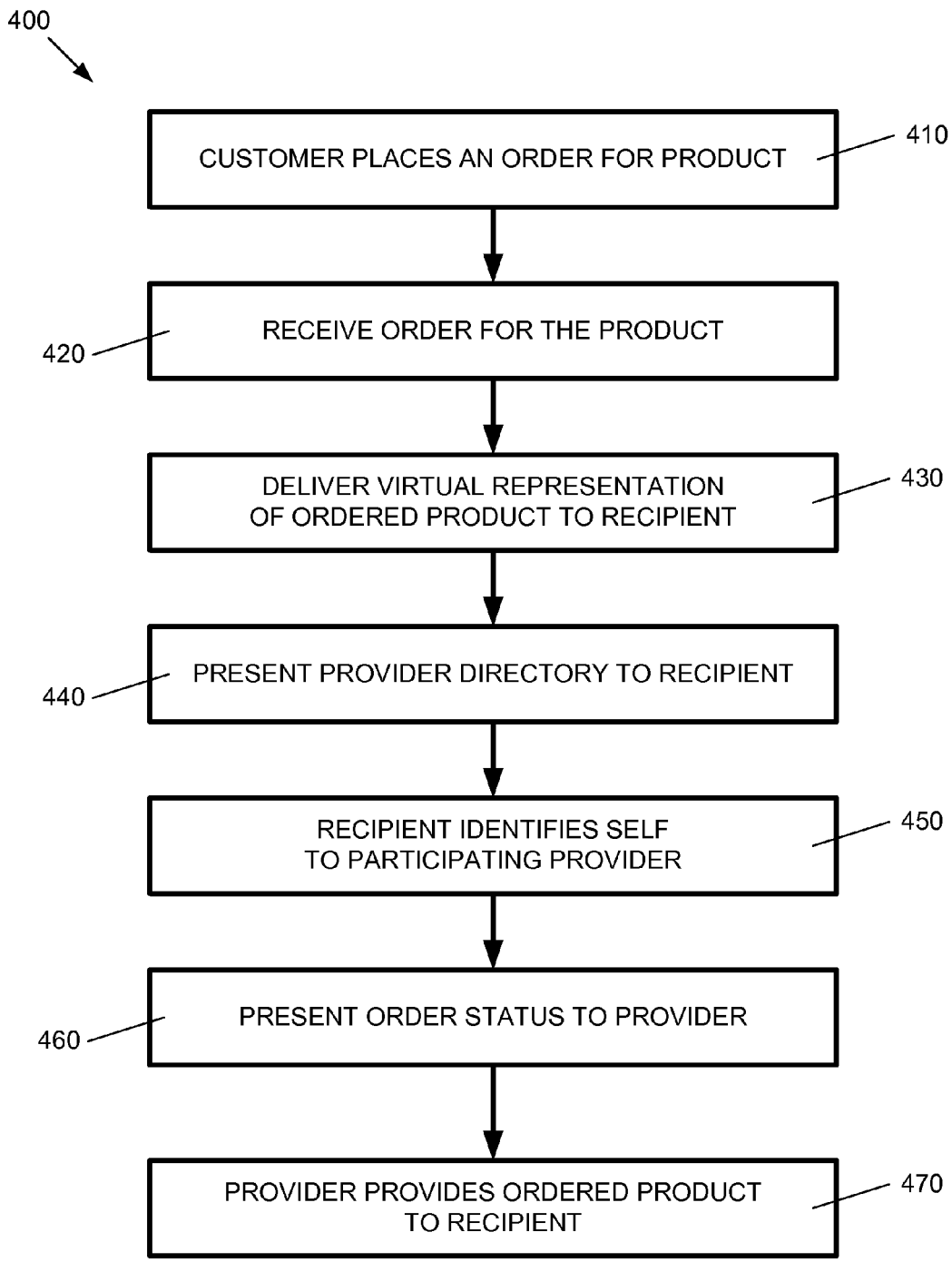
FIG. 4 illustrates a method of receiving and fulfilling an order, according to an exemplary embodiment of the present invention.

The various components of the order fulfillment system 300 may work in conjunction to receive and fulfill an order placed by a customer. FIG. 4 illustrates an exemplary method 400 for receiving and fulfilling an order placed through the order fulfillment system 300.

As shown in FIG. 4, at 410, the customer may place an order for a product, and during the ordering process, the customer may indicate a recipient of the ordered product. For example, the order fulfillment system 300 may be associated with a virtual bar, enabling the customer to purchase a beer for the recipient. At 420, the receipt module 320 may receive data related to the order. This data may indicate that a beer was purchased for the recipient. The delivery module 330 may deliver to the recipient a virtual representation of the ordered product at 430. For example, an animation of a beer being poured into a beer mug may be displayed on the recipient's client computer 102. Optionally, at 440, the recipient may view the provider directory 340. At 450, the recipient may present his or her identification to a provider located by the recipient via the directory 340 or via some other means. At 460, the status module 350 may present the provider with data relating to the order. If the order has not yet been fulfilled, at 470, the provider may provide the recipient with the ordered product, such as a beer, as per the order placed on the order fulfillment system 300. Accordingly, the order fulfillment system 300 may fulfill the customer's order both virtually and physically.

While the order fulfillment system 300 has been disclosed in exemplary forms, it will be apparent to those skilled in the art that many modifications, additions, and deletions may be made without departing from the spirit and scope of the system, method, and their equivalents, as set forth in the following claims.

What is claimed is:

1. A method for fulfilling an electronic order, the method comprising:
    receiving, over a computer network, at an order fulfillment server, an electronic order, from a computer associated with a sender, for a selected product to be furnished, on-demand, to a recipient other than the sender;
    responsive to receipt of the electronic order, (i) modifying, by the order fulfillment server, an electronic account associated with the recipient to indicate that the recipient is due to receive a specific quantity of the selected product, and (ii) generating, by the electronic order fulfillment server, a virtual representation of the selected product;
    outputting, by the order fulfillment server and for automatic and unprompted display at a computer associated with the recipient, (i) a prompt for the recipient to retrieve the selected product from a first provider of the recipients choosing from among a plurality of participating providers, at least two of the participating providers being unaffiliated with each other, and (ii) the virtual representation of the selected product;
    providing, at the order fulfillment server, access to a plurality of participating provider accounts, each participating provider account corresponding to a participating provider among the plurality of participating providers;
    responsive to a first participating provider of the plurality of participating providers accessing a corresponding participating provider account, outputting, by the order fulfillment server, a notification prompting the first participating provider to furnish, on-demand, the selected product to the recipient at a physical business location associated with the first participating provider;
    responsive to the selected product being furnished to the recipient, receiving, at the order fulfillment server, over the computer network, from a computer associated with the first provider, an electronic notification indicating that the recipient has physically received the selected product from the first provider; and
    responsive to receiving the electronic notification that the selected product was physically furnished to the recipient at the physical business location associated with the first participating provider, modifying, by the order fulfillment server, the electronic account associated with the recipient to decrease the specific quantity of the selected product due to the recipient.

2. The method of claim 1, the first provider of the plurality of participating providers representing a first company, and a second provider of the plurality of participating providers representing a second company unaffiliated with the first company.

3. The method of claim 1, further comprising indicating to the first provider whether the selected product is available to the recipient.

4. The method of claim 1, further comprising presenting the sender with an option to purchase a beverage for the recipient as the selected product, wherein the selected product is a beverage and at least one of the participating providers includes a bar.

5. The method of claim 1, further comprising directing the recipient to retrieve the selected product on demand from the first provider of the recipient's choosing, without prior notice to the first provider.

6. The method of claim 1, wherein the virtual representation of the selected product comprises a web-based media object.

7. The method of claim 6, wherein the web-based media object comprises at least one selected from a list comprising an image, an animation, and audio associated with the selected product.

8. The method of claim 1, further comprising modifying, by the order fulfillment server, an electronic account associated with the sender, to reflect payment for the selected product.

9. The method of claim 8, wherein the payment for the selected product is via actual currency or virtual currency.

10. The method of claim 1, wherein when a second participating provider of the plurality of participating providers accesses a corresponding participating provider account in response to an attempt by the recipient to retrieve the selected product after receiving the selected product from a first provider, the method further comprises outputting, by the order fulfillment server and for display at a computer associated with the second participating provider, an updated status of the electronic account associated with the recipient.

11. The method of claim 1, further comprising responsive to receiving the electronic notification that the selected product was physically furnished to the recipient at the physical business location associated with the first participating provider, outputting, by the order fulfillment server and for display at the computer associated with the sender, a notification that the recipient received the selected product.

12. The method of claim 1, further comprising:
   providing, to a computer associated with the first provider, the virtual representation of the selected product; and
   responsive to receipt, by the computer associated with the first provider, of the virtual representation of the selected product, receiving, at the order fulfillment server, over the computer network, from the computer associated with the first provider, an electronic notification that the recipient has requested to physically retrieve the selected product.

* * * * *